G. ADAMS.
SELF LOCKING FASTENING.
APPLICATION FILED SEPT. 4, 1907.

931,665. Patented Aug. 17, 1909.

WITNESSES:
Fred Staut.
C. O. Hall.

George Adams INVENTOR,
By F. W. H. Clay,
Atty.

UNITED STATES PATENT OFFICE.

GEORGE ADAMS, OF PITTSBURG, PENNSYLVANIA, ASSIGNOR, BY DIRECT AND MESNE ASSIGNMENTS, OF ONE-FOURTH TO JOSEPH P. BINGAMAN AND ONE-FOURTH TO DANIEL M. SACHTER, OF PITTSBURG, PENNSYLVANIA.

SELF-LOCKING FASTENING.

No. 931,665.  Specification of Letters Patent.  Patented Aug. 17, 1909.

Application filed September 4, 1907.  Serial No. 391,315.

*To all whom it may concern:*

Be it known that I, GEORGE ADAMS, a citizen of the United States, residing at Pittsburg, in the State of Pennsylvania, have invented a certain new and useful Self-Locking Fastening for Bath-Tub Legs and the Like, of which the following is a specification.

My invention relates to temporary fastenings, and is herein illustrated as particularly adapted for attaching the legs to bath tubs and stoves and the like. Its object is to provide a readily applied fastening which is secured by merely shoving it into place, and is self-locking so that it cannot come off unless especially removed with a tool.

Other objects are to simplify and cheapen the construction of such articles as bath tubs and stoves, and to improve the appearance of legs thereon.

In the accompanying drawing the invention is shown as adapted to a bath tub leg.

Figure 1:
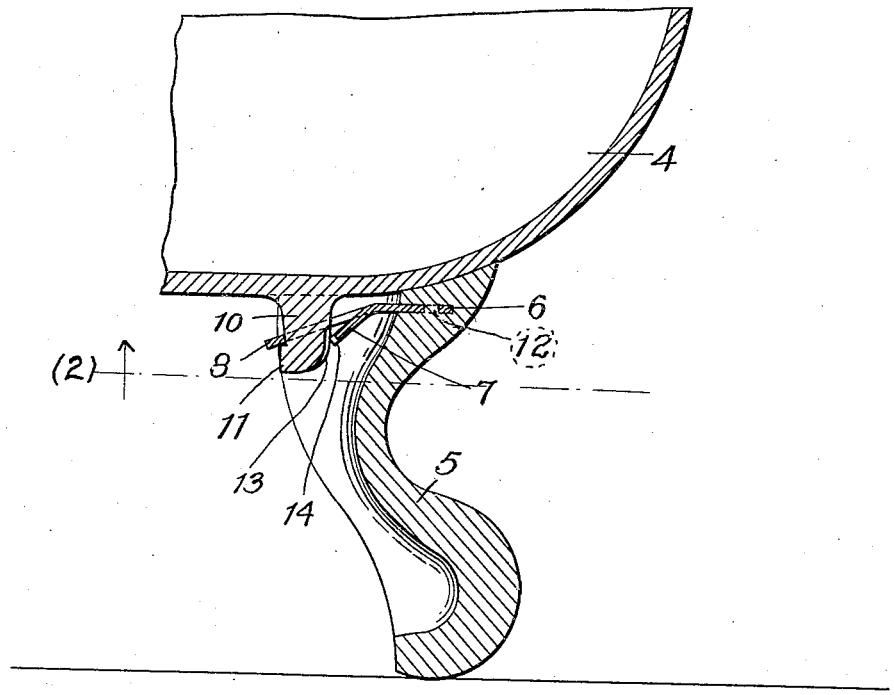
Figure 2:
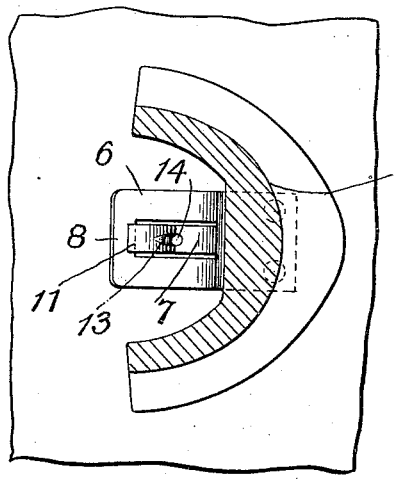
Figure 3:
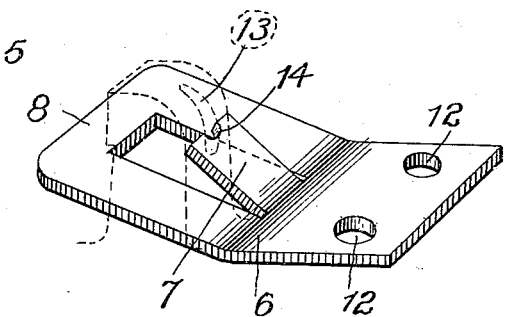

Figure 1 is a vertical section of part of a bath tub and of a cast iron leg adapted thereto with my invention. Fig. 2 is a section and under plan of a fastening, taken on line (2) in Fig. 1 and Fig. 3 is a perspective view of a spring clip.

It has been customary to attach the legs of bath tubs and similar articles, by tongue and groove joints which depend for their security upon friction of the groove or else use nuts and bolts or pins. Such fastenings always work loose when moved or knocked. In my invention the tub 4, for example, has a leg 5 which may be a casting, and in its base I preferably cast the steel plate 6, shown in Fig. 3, so that is projects forwardly as in Fig. 1 and it has an opening or socket partly closed by the spring-tongue 7, which in conjunction with the front bar 8 is pushed over and clamps upon the stud 10 preferably cast as part of the tub. The stud 10 has a laterally projecting flange 11 which is of proper height to pass through the opening of the clip and engage the cross-bar 8. The leg then being sprung backward, the spring-tongue 7 is forced over the rounded back of the stud 10 until the base of the leg comes in firm with the tub, the tongue 7 meanwhile yielding as required to pinch down tightly upon the stud 10. It preferably is of proper length to engage the stud 10 a little below the line of the pivot contact of bar 8, and thus any effort of the leg to spring back again merely tightens the hold of the tongue 7. Meanwhile of course the spring pressure of the tongue 7 forces the bar 8 upward under the ledge 11 and the base of the leg is pushed into tight contact with the tub.

The plate 6 preferably has holes 12 in order to secure it better in the casting and the tongue 7 is provided with a slot or niche 14 for the insertion of a tool to relieve its pressure and readily remove the leg when desired. The stud 10 may also have a slot 13 for convenience of inserting the tool. Evidently various modifications of plate 6 and its tongue and the stud 10 may be made for attachment to different articles, and the advantages of the device will be readily apparent to those familiar with the art.

Having thus described my invention and illustrated its use, what I claim as new and desire to secure by Letters Patent, is the following:—

1. A locking attachment comprising a member provided with a flanged stud, and a coöperating member provided with a plate with an opening to engage the flanged stud and a spring tongue adjacent to the opening adapted to clamp upon the stud opposite to the flange thereof so as to hold the parts together against rocking motion.

2. The combination with an article having a stud with a flange on one side, of another article for attachment against the first having a plate with an opening to receive the stud, and a spring-tongue wedged on the stud and clamping on the side opposite to the flange, substantially as described.

3. A bath tub leg fastening comprising a stud on the tub having a laterally projecting flange on one side, a plate attached to the leg having an opening to receive the stud and a spring-tongue bent out from the plate and of a length to be forced down and lock against the face of the stud opposite the flange, substantially as described.

4. A bath tub leg fastening comprising a stud with a lateral flange, a cast iron leg having a steel plate cast therein and having an opening to receive the stud, and a spring-tongue 7 partially closing the opening of the plate and adapted to automatically find a seat opposite to the flange, thereby clamping the stud in the opening of the plate.

5. A fastening for the legs of bath tubs and the like, comprising the combination of a fixed stud on the tub having one side flanged, and a plate on the leg having an opening adapted to fit over the stud and engage the flange, and a spring tongue on the side of the plate opposite the flange adapted to lock upon the stud to hold the two in firm engagement and prevent the leg from rocking.

In testimony whereof, I have hereunto signed my name in the presence of the two subscribed witnesses.

GEORGE ADAMS.

Witnesses:
 GEO. B. BLEMING,
 F. W. H. CLAY.